June 13, 1939.    C. L. EKSERGIAN    2,162,072
COMPOSITE BRAKE DRUM
Filed April 5, 1935

INVENTOR.
Carolus L. Eksergian
BY
John P. Barbour
ATTORNEY.

Patented June 13, 1939

2,162,072

UNITED STATES PATENT OFFICE 2,162,072

COMPOSITE BRAKE DRUM

Carolus L. Eksergian, Detroit, Mich., assignor to Budd Wheel Company, Philadelphia, Pa., a corporation of Pennsylvania Application April 5, 1935, Serial No. 14,746

3 Claims. (Cl. 188—218)

The invention relates to brake drums and more particularly to composite brake drums of the type having a cast braking ring supported from the hub by a sheet metal supporting head.

The object of the invention is to decrease the overall weight of this type of brake drum, to save in the amount of metal used in the casting operation, to save in machining operations after the casting, and to produce a very strong combined mechanical and fused joinder between the cast brake ring and the sheet metal head.

These and other objects and advantages are attained by the construction hereinafter more specifically described in connection with the drawing forming a part of this specification.

Figure 1:
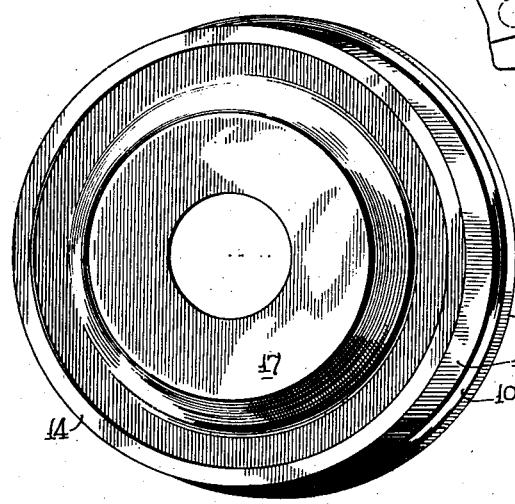
Figure 1 is a perspective view of a brake drum according to the invention.
Figure 2:
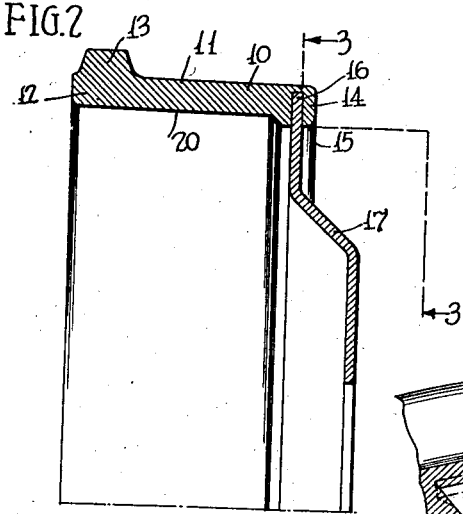
Figure 2 is an axial cross section showing one half of the drum.
Figure 3:
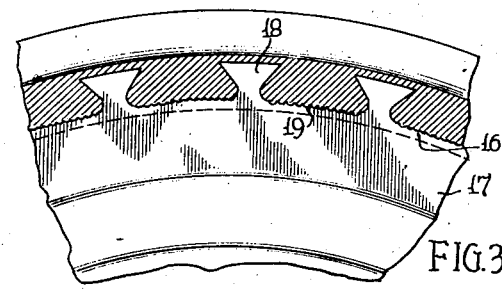
Figure 3 is a fragmentary detail sectional view taken along the line 3—3 of Figure 2, looking in the direction of the arrows.

In the preferred embodiment of the invention, as shown in Figures 1, 2 and 3, the cast braking ring or brake engaging member 10 comprises a relatively thin main body 11 extending between the free end portion 12 thickened by an axially outwardly projecting rib 13 and the supported end portion 14 axially beyond the braking surface 20 is thickened by a radially inwardly projecting bead 15.

The end 14 is cast onto the generally radially extending and circumferentially continuous outer peripheral anchoring portion 16 of the sheet metal annular drum head 17, the inner portion of which is secured in the usual manner to the hub (not shown). The weight of the head is reduced and interlocking means is provided by decreasing the outer diameter of the main body of the head to a diameter but slightly greater than the inner diameter of the bead 15, which can be clearly seen in Figure 3. Suitable interlocking is obtained with the cast metal ring by having spaced narrow dovetail shaped projections 18 having sharply attenuated points extending substantially to the radially outer face of the cast metal ring. These dovetail projections are spaced a substantial distance apart, preferably more than the circumferential thickness of the projections and to obtain a still stronger bond between the periphery 16 of the head and the cast metal brake ring, the periphery of the head 17 between the spaced projections 18 may be formed with numerous smaller projections 19 interlocking with the metal of the ring.

It will be seen that the sheet metal head is of very substantially smaller gauge than the brake ring 10 and that the surface of the sheet metal head, which is in contact with the cast metal brake ring 10, is relatively small as compared with the mass of the metal of the ring encompassing it. Accordingly, the thickness of the cast ring need not be as great in the original casting operation, and accordingly, the weight of cast metal used in casting a drum can be reduced, while at the same time insuring not only a mechanically interlocked bond between the brake ring 10 and the head through the dovetail projections 18, but also obtaining a good fused joinder between the cast metal and the peripheral margin of the head through the projections 18 and 19. The relatively thin and small area projections have a slower chilling effect upon the hot cast metal and their peripheral portions are therefore raised to a high temperature by the hot cast metal and more thoroughly fused with the cast metal ring of the drum.

With this construction a minimum of machining is required, since the outer portion of the ring may be sufficiently finished in the casting, the only part which requires to be machined being the inner braking surface indicated at 20.

The relatively thin narrow spaced projections of small area have a mass which is very small as compared with the mass of the cast metal in which they are embedded. This not only makes for a strong fused joinder between the parts but also produces less of a chilling effect upon the surrounding cast metal so that the braking surface can be readily machined close to the joint. This again makes it possible to utilize less cast metal since it permits reducing the over-all width of the cast brake ring or brake engaging member. Yet further, the location of the cast-on connection beyond the braking surface has the advantage that the chilling effect of the embedded periphery of the head is not communicated to the braking surface. This greatly facilitates the machining of said surface and further reduces the cost of manufacture.

By this construction I have been able to very materially reduce the weight and cost of manufacture of this composite type of drum, while at the same time obtaining a strong joinder of the parts without chilling the metal of the braking surface.

Figure 4:
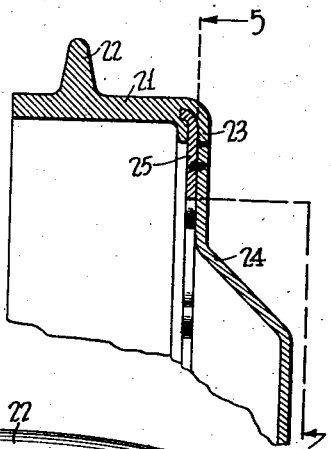
Figure 4 is an axial sectional view corresponding to Figure 2 of a modified form of the invention.
Figure 5:
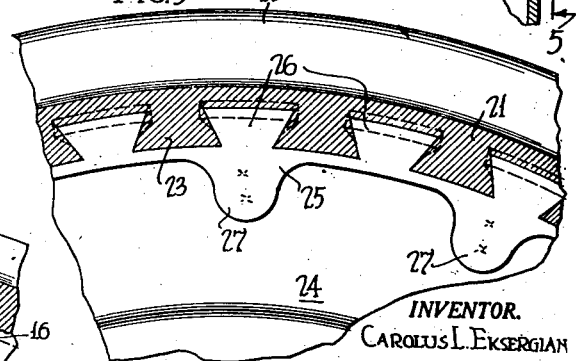
Figure 5 is a fragmentary detail sectional view taken substantially along the line 5—5 of Figure 4.

In Figures 4 and 5, there is shown a modification of the preferred form in which the cast brake ring 21 has an outwardly extending annular rib 22 somewhat inwardly removed from its free end and has its supported end thickened by an inwardly extending flange and a radially inwardly extending rib 23 somewhat deeper than the rib 15 shown in Figure 2. According to this form of the invention the main body 24 of the brake drum head is not directly cast into the ring 21, but a separate sheet metal ring 25 having peripheral dovetail projections 26, the radially outer margins of which are slightly axially extended, is first cast into the ring 21 and is subsequently welded to the outer periphery of the main body 24 of the head through the inwardly extending projections 27 on the ring 25. This construction has substantially all the advantages of the construction shown in the preferred form, although it may require slightly increased weight on account of the overlap between the sheet metal body 24 and the ring 25, and also by reason of the closer spacing and area of the dovetails 26.

Figure 6:
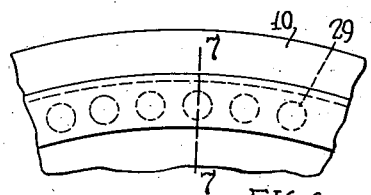
Figure 6 is a fragmentary elevational view.
Figure 7:
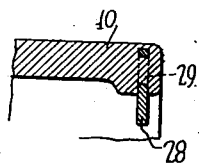
Figure 7 is a fragmentary axial sectional view on line 7—7 of Figure 6 showing a further modification of the joint between the cast metal brake ring and the sheet metal head.

Another method of joinder of the outer periphery of the head to the brake ring as 10, is indicated in Figures 6 and 7 where the outer periphery of the supporting head 28 is shown provided with a plurality of closely spaced holes 29 through which the cast metal of the ring 10 flows to lock the parts together. It will be understood that in each instance the body of the brake drum head and the peripheral portion thereof which is cast into the annular brake ring may be a single stamping as shown in Figure 2 or two separate stampings, as shown in Figure 4, that is to say, the particular cast joint shown in any one of the figures might be used with any one of the other forms if desired.

While in the foregoing description specific forms of the invention have been described, it will be understood that changes and modifications may be made from the particular constructions shown and described, without departing from the spirit of the invention, and such changes and modifications are intended to fall within the spirit and scope of the appended claims.

What I claim is:

1. A brake drum comprising a sheet metal supporting ring having its peripheral margin extending generally radially and formed with relatively widely spaced projections of substantial length, and relatively closely spaced and short projections in the spaces between said first-named projections, and a cast metal brake ring having one end thereof thickened and cast onto said margin and fusedly and mechanically interlocked with said projections.

2. A brake drum comprising a relatively thin sheet metal head having a generally radially extending circumferentially continuous peripheral anchoring portion and an annular cast brake engaging member having an exposed heat radiating external surface and an internal braking surface of a diameter less than the outer diameter of the head, said brake engaging member having an end portion relatively thick and massive completely embedding said peripheral anchoring portion and spacing said head from said braking surface to prevent chilling of the latter.

3. A brake drum comprising a relatively thin sheet metal head having a generally radially extending circumferentially continuous peripheral anchoring portion bearing relatively narrow dovetail-like projections having sharply attenuated points and an annular cast brake engaging member having an exposed heat radiating external surface and an internal braking surface of a diameter less than the outer diameter of the head, said brake engaging member having an end portion axially beyond said braking surface completely embedding said peripheral anchoring portion but to a slight depth only between the dovetail-like projections, whereby chilling of the braking surface is avoided and a strong fused joinder between the parts is attained.

CAROLUS L. EKSERGIAN.